United States Patent
Kobayashi et al.

(10) Patent No.: US 7,482,553 B2
(45) Date of Patent: Jan. 27, 2009

(54) LASER BEAM PROCESSING MACHINE

(75) Inventors: Satoshi Kobayashi, Tokyo (JP); Keiji Nomaru, Tokyo (JP)

(73) Assignee: Disco Corporation, Tokyo (JP)

( * ) Notice: Subject to any disclaimer, the term of this patent is extended or adjusted under 35 U.S.C. 154(b) by 513 days.

(21) Appl. No.: 11/224,066

(22) Filed: Sep. 13, 2005

(65) Prior Publication Data

US 2006/0076326 A1 Apr. 13, 2006

(30) Foreign Application Priority Data

Sep. 28, 2004 (JP) .............................. 2004-280870

(51) Int. Cl.
*B23K 26/00* (2006.01)
*B23K 26/067* (2006.01)

(52) U.S. Cl. ........................... 219/121.68; 219/121.75; 219/121.77

(58) Field of Classification Search ............ 219/121.77, 219/121.67–121.69, 121.72, 121.73–121.75; 438/33, 113, 458, 460, 462, 463
See application file for complete search history.

(56) References Cited

U.S. PATENT DOCUMENTS

| | | | | |
|---|---|---|---|---|
| 4,350,867 A | * | 9/1982 | Kinoshita et al. | 219/121.63 |
| 5,155,323 A | * | 10/1992 | Macken | 219/121.64 |
| 5,283,599 A | * | 2/1994 | Tejima et al. | 353/30 |
| 5,841,097 A | * | 11/1998 | Esaka et al. | 219/121.63 |
| 6,211,488 B1 | * | 4/2001 | Hoekstra et al. | 219/121.72 |
| 6,417,485 B1 | * | 7/2002 | Troitski | 219/121.69 |
| 7,211,526 B2 | * | 5/2007 | Iri et al. | 438/797 |
| 7,223,937 B2 | * | 5/2007 | Nagai et al. | 219/121.72 |
| 2005/0006361 A1 | | 1/2005 | Kobayashi et al. | |
| 2006/0289410 A1 | * | 12/2006 | Morita et al. | 219/121.67 |

FOREIGN PATENT DOCUMENTS

| | | | | |
|---|---|---|---|---|
| JP | 362246146 A | * | 10/1987 | |
| JP | 363180801 A | * | 7/1988 | |
| JP | 401246828 A | * | 10/1989 | |
| JP | 402244289 A | * | 9/1990 | |
| JP | 408180484 A | * | 7/1996 | |
| JP | 2002192370 | | 7/2002 | |
| JP | 3408805 | | 3/2003 | |

* cited by examiner

*Primary Examiner*—Samuel M Heinrich
(74) *Attorney, Agent, or Firm*—Smith, Gambrell & Russell, LLP

(57) ABSTRACT

A laser beam processing machine comprising a chuck table for holding a workpiece, a laser beam application means for applying a laser beam capable of passing through the workpiece to the workpiece held on the chuck table, and a processing-feed means for moving the chuck table and the laser beam application means relative to each other, the laser beam application means comprising a laser beam oscillation means, an optical transmission means for transmitting a laser beam oscillated by the laser beam oscillation means, and a transmitting/converging means having a single condenser lens for converging laser beams transmitted by the optical transmission means, wherein the transmitting/converging means converges a laser beam oscillated from the laser beam oscillation means at two or more focusing points which are displaced in the direction of the optical axis and the processing-feed direction through the single condenser lens.

3 Claims, 3 Drawing Sheets

Figure 1:
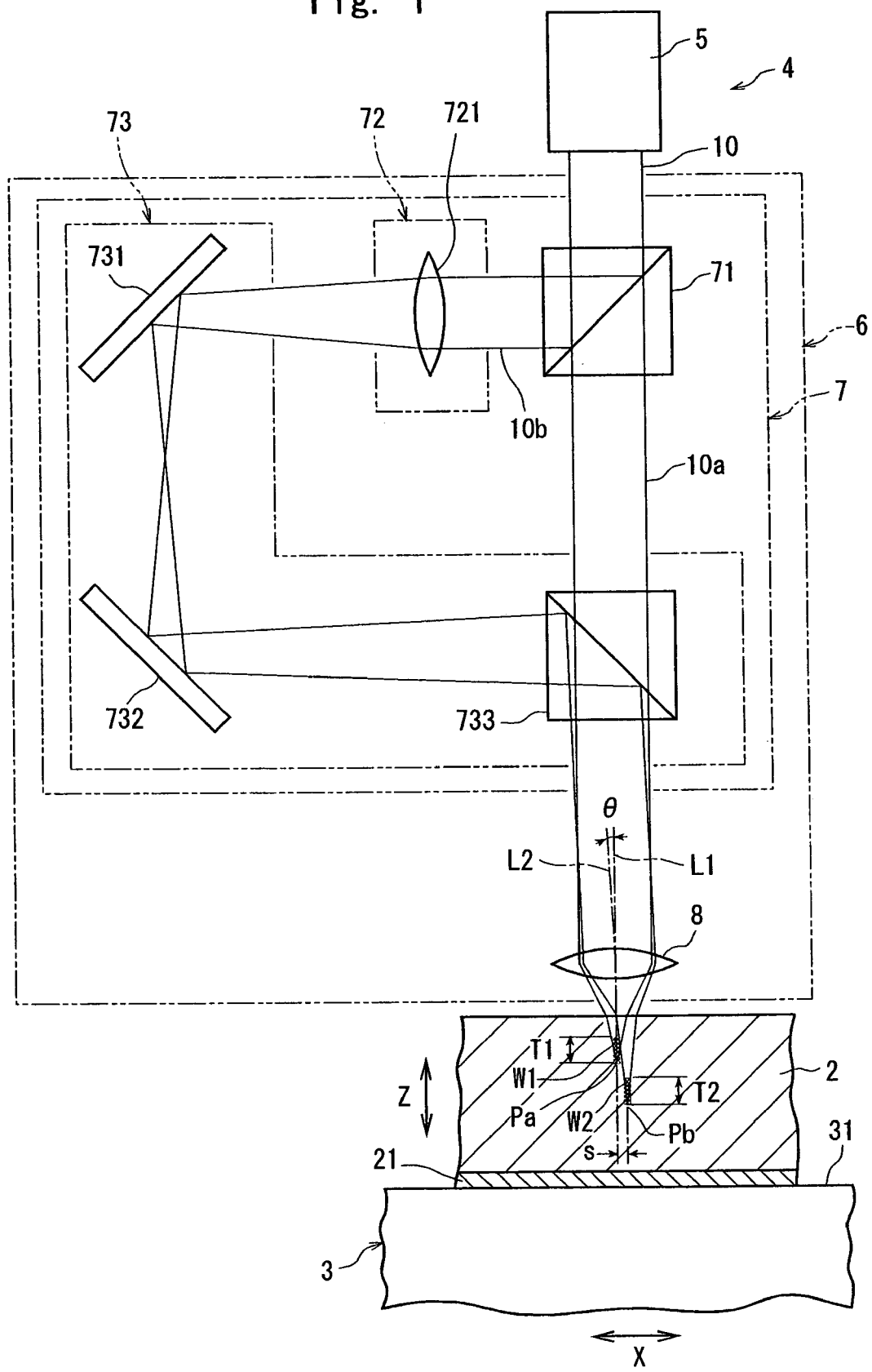
Figure 4:
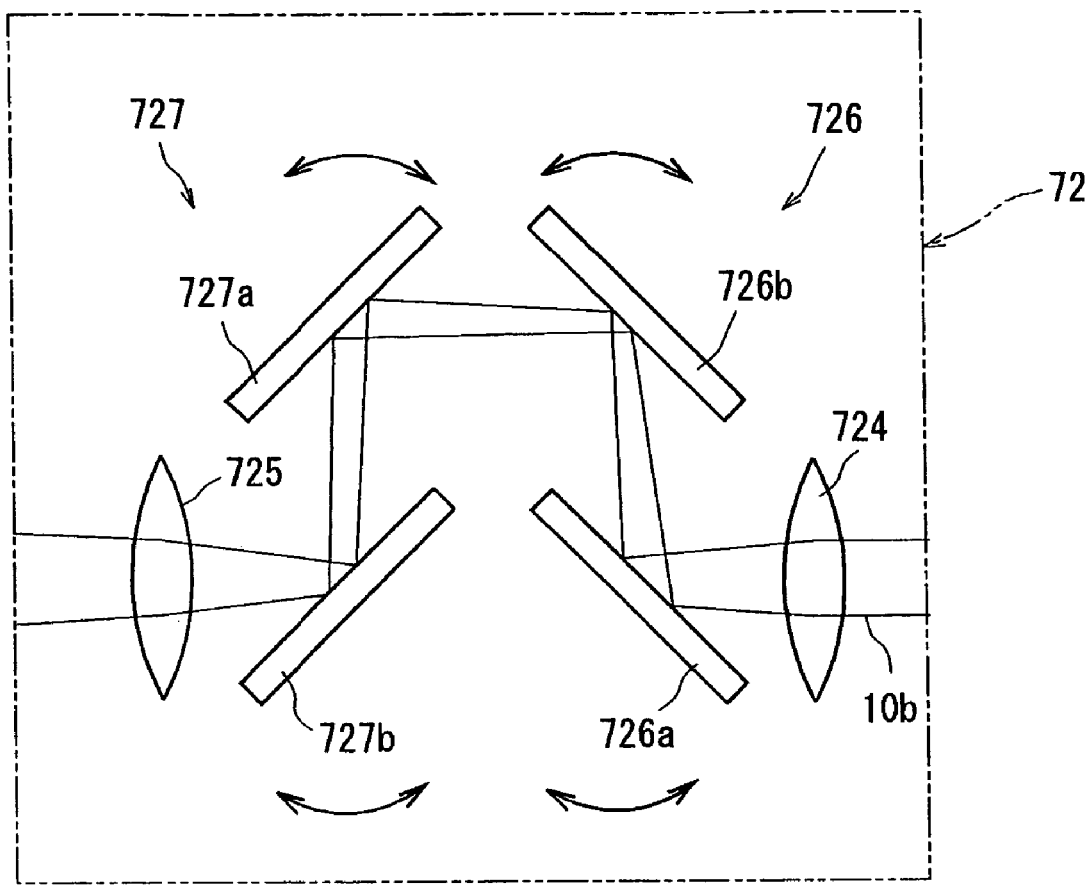

LASER BEAM PROCESSING MACHINE

FIELD OF THE INVENTION

The present invention relates to a laser beam processing machine for forming a deteriorated layer in the inside of a workpiece by applying a laser beam such as a pulse laser beam capable of passing through the workpiece.

DESCRIPTION OF THE PRIOR ART

In the production process of a semiconductor device, a plurality of areas are sectioned by dividing lines called "streets" arranged in a lattice pattern on the front surface of a wafer comprising a suitable substrate such as a silicon substrate, sapphire substrate, silicon carbide substrate, lithium tantalite substrate, glass substrate or quartz substrate, and a circuit (function element) such as IC or LSI is formed in each of the sectioned areas. Individual semiconductor devices are manufactured by cutting the wafer along the dividing lines to divide it into the areas each having a circuit formed thereon. To divide the wafer, there are proposed various methods making use of a laser beam.

U.S. Pat. No. 6,211,488 and Japanese Patent No. 3408805 disclose a wafer dividing method comprising the steps of converging a pulse laser beam in an intermediate portion in the thickness direction of a wafer and moving the pulse laser beam and the wafer relative to each other along dividing lines to form a deteriorated layer in the intermediate portion in the thickness direction of the wafer along the dividing lines, and then, exerting external force on the wafer to divide it along the deteriorated layers.

It is, however, conceivable not only that the deteriorated layer is formed in the intermediate portion in the thickness direction of the wafer but also that the deteriorated layer is formed along the dividing lines in a portion from the back surface up to a predetermined depth or in a portion from the front surface to a predetermined depth in place of the intermediate portion in the thickness direction or in addition thereto. In either case, to divide the wafer along the dividing lines precisely by applying external force to the wafer, the thickness of the deteriorated layer, that is, the measurement of the deteriorated layer in the thickness direction of the wafer must be made relatively large. Since the thickness of the deteriorated layer is 10 to 50 μm near the focusing point of a pulse laser beam, when the thickness of the deteriorated layer is to be increased, it is necessary to change the position of the focusing point of the pulse laser beam in the thickness direction of the wafer and then, to move the pulse laser beam and the wafer relative to each other along each dividing line repeatedly. Therefore, in the case where the wafer is thick, it takes long to form the deteriorated layer thick enough to divide the wafer precisely.

To solve the above problem, the applicant previously proposed a laser beam processing machine, which was so constituted as to allow a pulse laser beam to converge at at least two points that have been displaced from each other in the direction of its optical axis as Japanese patent application No. 2003-273341. With this laser beam processing machine, deteriorated layers can be formed at positions of at least two focusing points which are displaced from each other in the thickness direction of a workpiece, that is, a wafer at the same time. However, as this laser beam processing machine applies a laser beam with its focusing points displaced from each other on the same optical axis in the thickness direction of the wafer, a laser beam having a shallow focusing point obstructs the application of a laser beam having a deep focusing point, thereby making it impossible to form a desired deteriorated layer.

SUMMARY OF THE INVENTION

It is an object of the present invention to provide a laser beam processing machine capable of forming a plurality of deteriorated layers to a desired thickness at the same time without allowing a laser beam having a shallow focusing point to obstruct the application of a laser beam having a deep focusing point.

According to the present invention, the above object of the present invention can be attained by a laser beam processing machine comprising a chuck table for holding a workpiece, a laser beam application means for applying a laser beam capable of passing through the workpiece to the workpiece held on the chuck table, and a processing-feed means for moving the chuck table and the laser beam application means relative to each other, the laser beam application means comprising a laser beam oscillation means and a transmitting/converging means having an optical transmission means for transmitting a laser beam oscillated by the laser beam oscillation means and having a single condenser lens for converging laser beams transmitted by the optical transmission means, wherein the transmitting/converging means causes a laser beam oscillated from the laser beam oscillation means to converge on two or more focusing points which are displaced in the processing-feed direction and in the thickness direction of the workpiece held on the chuck table through the single condenser lens.

The above optical transmission means comprises a beam splitter for dividing a laser beam oscillated by the laser beam oscillation means into a first laser beam and a second laser beam, a focusing point position displacing means for displacing the focusing point of the first laser beam and the focusing point of the second laser beam in the processing-feed direction, and a focusing point depth displacing means for displacing the focusing point of one of the first laser beam and the second laser beam in the thickness direction of the workpiece held on the above chuck table. The focusing point position displacing means has a plurality of mirrors to change displacement between the focusing point of the first laser beam and the focusing point of the second laser beam in the processing-feed direction by changing the installation angles of the plurality of mirrors. The focusing point depth displacing means changes the beam divergence angle of the laser beam.

In the laser beam processing machine of the present invention, a laser beam oscillated from the laser beam oscillation means is converged at two or more focusing points which are displaced from each other in the direction of its optical axis and in its processing-feed direction, whereby a deteriorated layer formed at one of the focusing points does not obstruct the irradiation of a laser beam having the other focusing point. Therefore, a plurality of deteriorated layers having a desired thickness can be formed at the same time.

BRIEF DESCRIPTION OF THE DRAWINGS

FIG. 1 is a schematic diagram of a laser beam processing machine constituted according to the present invention;

FIG. 2 is a diagram showing a state where two deteriorated layers are formed in the inside of a workpiece by the laser beam processing machine shown in FIG. 1 at the same time;

FIG. 3 is a schematic diagram of another example of the focusing point depth displacing means provided in the laser beam processing machine shown in FIG. 1; and FIG. 4 is a schematic diagram of still another example of the focusing point depth displacing means provided in the laser beam processing machine shown in FIG. 1.

DETAILED DESCRIPTION OF THE PREFERRED EMBODIMENTS

Preferred embodiments of a laser beam processing machine constituted according to the present invention will be described in detail with reference to the accompanying drawings hereinafter.

FIG. 1 is a schematic diagram of a laser beam processing machine constituted according to the present invention. The illustrated machine comprises a chuck table 3 for holding a wafer 2 as a workpiece and a laser beam application means denoted by 4.

The chuck table 3 comprises an adsorption chuck 31 formed from a porous member or having a plurality of suction holes or grooves, and the adsorption chuck 31 is communicated with a suction means that is not shown. Therefore, a protective tape 21 affixed to the side of a surface on which a circuit is formed, of the wafer 2 as the workpiece is placed on the adsorption chuck 31 and suction-held on the chuck table 3 by activating the suction means that is not shown. The thus constituted chuck table 3 is so constituted as to be moved in a processing-feed direction indicated by an arrow X in FIG. 1 by a processing-feed means that is not shown. Therefore, the chuck table 3 and the laser beam application means 4 can move relative to each other in the processing-feed direction indicated by the arrow X.

The laser beam application means 4 comprises a pulse laser beam oscillation means 5 and a transmitting/converging means 6 for transmitting and converging a pulse laser beam oscillated by the pulse laser beam oscillation means 5. The pulse laser beam oscillating means 5 oscillates a pulse laser beam 10 capable of passing through the wafer 2 as the workpiece. As this pulse laser beam oscillation means 5 may be used a YVO4 pulse laser beam oscillator or YAG pulse laser oscillator for oscillating the pulse laser beam 10 having a wavelength of 1,064 nm, for example, when the wafer 2 is a wafer comprising a silicon substrate, silicon carbide substrate, lithium tantalite substrate, glass substrate or quartz substrate.

Description will be continued with reference to FIG. 1. The transmitting/converging means 6 of the laser beam application means 4 is interposed between the pulse laser beam oscillation means 5 and the wafer 2 as the workpiece held on the chuck table 3. The transmitting/converging means 6 in the illustrated embodiment comprises an optical transmission means 7 for transmitting a pulse laser beam oscillated by the pulse laser beam oscillation means 5 and a condenser lens 8 such as an objective lens for converging pulse laser beams transmitted by the optical transmission means 7. The optical transmission means 7 comprises a beam splitter 71, a focusing point depth displacing means 72 for displacing the focusing point of the laser beam in the thickness direction (i.e., in the direction indicated by an arrow Z in FIG. 1) of the wafer 2 as the workpiece held on the above chuck table 3, and a focusing point position displacing means 73 for displacing the focusing point of a laser beam passing through the focusing point depth displacing means 72 in the processing-feed direction indicated by the arrow X in FIG. 1. The focusing point depth displacing means 72 is composed of a convex lens 721 in the illustrated embodiment. The focusing point position displacing means 73 comprises a first mirror 731, a second mirror 732 and a beam splitter 733.

In the above-described laser beam processing machine, the pulse laser beam 10 oscillated from the pulse laser beam oscillation means 5 is separated into two pulse laser beams 10a and 10b by the beam splitter 71, that is, a first pulse laser beam 10a passing straight through the beam splitter 71 and a second pulse laser beam 10b reflected by the beam splitter 71 to change its direction substantially at a right angle. The first pulse laser beam 10a passes through the beam splitter 733 and is converged at a focusing point Pa in the inside of the wafer 2 as the workpiece by the condenser lens 8.

Meanwhile, the second pulse laser beam 10b passes through the convex lens 721 as the focusing point depth displacing means 72 to change its beam divergence angle. In the illustrated embodiment, after the second pulse laser beam 10b passes through the convex lens 721, its divergent angle so decreases as to make its diameter smaller gradually as it becomes farther away from the convex lens 721. The second pulse laser beam 10b whose divergent angle has been changed by passing through the convex lens 721 is reflected by the first mirror 731 and the second mirror 732, and further by the beam splitter 733 at angles corresponding to their installation angles. The second pulse laser beam 10b which has been reflected by the beam splitter 733 at an angle corresponding to its installation angle reaches the condenser lens 8 at a predetermined angle θ formed between its optical axis L2 and the optical axis L1 of the above first pulse laser beam 10a. Since the divergent angle of the second pulse laser beam 10b incident on the condenser lens 8 is changed by passing through the convex lens 721 as the above focusing point depth displacing means 72, its diameter is also changed. The second pulse laser beam 10b passing through the condenser lens 8 is converged at a focusing point Pb in the inside of the wafer 2 as the workpiece.

The focusing point Pb of the second pulse laser beam 10b is displaced from the focusing point Pa of the first pulse laser beam 10a by a distance "S" in the processing-feed direction indicated by the arrow X in FIG. 1 as the optical axis L2 of the second pulse laser beam 10b incident on the condenser lens 8 has the predetermined angle θ against the optical axis L1 of the first pulse laser beam 10a, as described above. This displacement "S" can be suitably changed by altering the installation angles of the first mirror 731 and the second mirror 732. When the second pulse laser beam 10b to be incident on the objective condenser lens 8 passes through the convex lens 721 as the focusing point depth displacing means 72, its divergent angle is changed and its beam diameter is gradually increased toward the condenser lens 8 through the first mirror 731, the second mirror 732 and the beam splitter 733, whereby its focusing point Pb is located at a position deeper (at a lower position in FIG. 1) than the focusing point Pa of the first pulse laser beam 10a, that is, farther away from the objective condenser lens 8 in the direction of the optical axis. The depth of the focusing point Pb can be suitably adjusted by moving the convex lens 721 as the focusing point depth displacing means 72 in the direction of the optical axis.

When the first pulse laser beam 10a is converged at the focusing point Pa, consequently, a deteriorated layer W1 is formed in the wafer 2 that is a workpiece near the focusing point Pa, generally, in an area having a thickness T1 from the focusing point Pa toward an upward direction. Further, when the second pulse laser beam 10b is converged at the focusing point Pb, a deteriorated layer W2 is formed in the wafer 2 as the workpiece near the focusing point Pb, generally, in an area having a thickness T2 from the focusing point Pb toward an upward direction. At this point, since the focusing point Pb of the second pulse laser beam 10b is displaced from the focusing point Pa of the first pulse laser beam 10a by the distance "S" in the processing-feed direction indicated by the arrow X in FIG. 1, the first pulse laser beam 10a and the second pulse laser beam 10b do not interfere with each other, and the second pulse laser beam 10b having a deeper focusing point is not obstructed by the first pulse laser beam 10a having a shallow focusing point. Therefore, the deteriorated layers W1 and W2 having a desired depth can be formed near the focusing point Pa of the first pulse laser beam 10a and near the focusing point Pb of the second pulse laser beam 10b, respectively. The deteriorated layers formed in the wafer 2 as the workpiece are generally molten and re-solidified (that is, molten when the pulse laser beams 10a and 10b are converged and then, solidified after the convergence of the pulse laser beams 10a and 10b), namely, are in a state of voids or cracks, though this depends on the material of the wafer 2 and the intensities of the converged pulse laser beams 10a and 10b.

Figure 2:
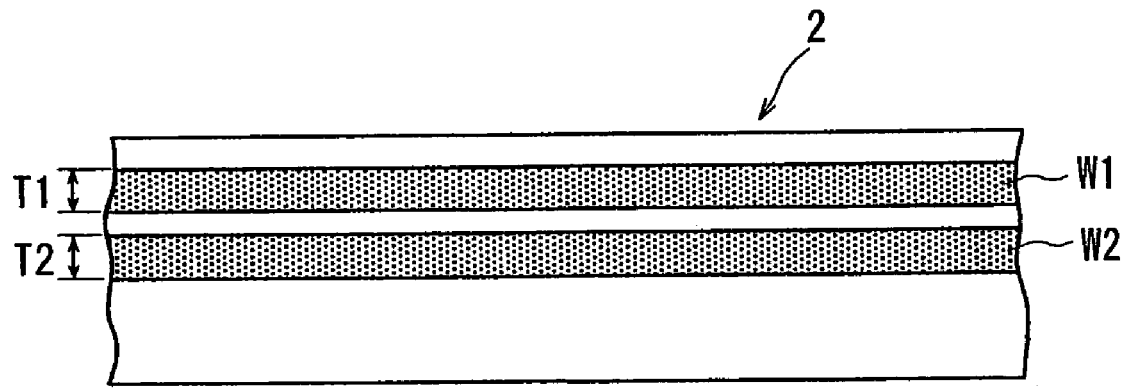

The laser beam processing machine in the illustrated embodiment moves the chuck table 3 (namely, the wafer 2 as the workpiece held on the chuck table 3), for example, in a left direction in FIG. 1 while a pulse laser beam is applied, as described above. As a result, two deteriorated layers W1 and W2 having thicknesses T1 and T2 are formed along a predetermined dividing line in the inside of the wafer at the same time, as shown in FIG. 2. As described above, according to the laser beam processing machine in the illustrated embodiment, the deteriorated layers W1 and W2 having thicknesses T1 and T2 can be formed in two areas which are displaced from each other in the thickness direction of the wafer 2 as the workpiece by using the single laser beam application means 4 at the same time. When the deteriorated layers W1 and W2 are to be formed continuously, for example, the convex lens 721 as the focusing point depth displacing means 72 is moved in the left direction in FIG. 1 to move upward the focusing point Pb of the second pulse laser beam 10b, and the focusing point Pb is set to be positioned lower than the focusing point Pa of the first pulse laser beam 10a by the thickness T2.

The laser processing conditions in the above laser processing are set as follows, for example.
Light source: LD excited Q switch Nd:YVO4 pulse laser
Wavelength: 1,064 nm
Pulse output: 2.5 µJ
Focusing spot diameter: 1 µm
Pulse width: 40 ns
Repetition frequency: 100 kHz
Processing-feed rate: 100 mm/sec When the wafer 2 as the workpiece is thick and hence, the deteriorated layers W1 and W2 having thicknesses T1 and T2 are not sufficient for dividing the wafer precisely along the dividing lines, the laser beam application means 4 and the chuck table 3 are moved relative to each other by a predetermined distance in the direction of the optical axis, that is, in the vertical direction indicated by the arrow Z in FIG. 1. Thereby, the focusing point Pa and the focusing point Pb are displaced in the direction of the optical axis, that is, in the thickness direction of the wafer 2 as the workpiece, and the chuck table 3 is moved in the processing-feed direction indicated by the arrow X in FIG. 1 while a pulse laser beam is applied from the laser beam application means 4. As a result, deteriorated layers W1 and W2 having thicknesses T1 and T2 can be newly formed in the wafer as the workpiece at positions displaced in the thickness direction in addition to the above deteriorated layers W1 and W2.

A description is subsequently given of another example of the focusing point depth displacing means 72 with reference to FIG. 3.

Figure 3:
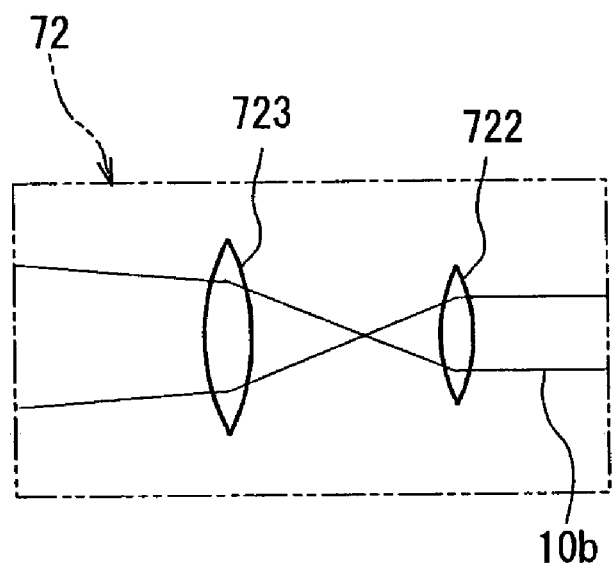

The focusing point depth displacing means 72 shown in FIG. 3 comprises a first convex lens 722 and a second convex lens 723 which are spaced apart from each other in the direction of the optical axis. In the focusing point depth displacing means 72 shown in FIG. 3, the diameter of its divergent angle is designed to gradually become larger as it becomes farther away from the second convex lens 723 after the second pulse laser beam 10b passes through the first convex lens 722 and the second convex lens 723. The divergent angle of the second pulse laser beam 10b and the beam diameter of the second pulse laser beam 10b incident on the above condenser lens 8, that is, the depth position of the focusing point Pb of the second pulse laser beam 10 that passes through the focusing point depth displacing means 72 and is converged by the above condenser lens 8 can be suitably adjusted by moving the first convex lens 722 or the second convex lens 723 in the direction of the optical axis.

A description is subsequently given of still another example of the focusing point depth displacing means 72 with reference to FIG. 4.

The focusing point depth displacing means 72 shown in FIG. 4 comprises a third convex lens 724 and a fourth convex lens 725 which are spaced apart from each other, and a first pair of mirrors 726 and a second pair of mirrors 727 which are interposed between the third convex lens 724 and the fourth convex lens 725. The first pair of mirrors 726 consist of a first mirror 726a and a second mirror 726b which are parallel to each other and fixed on a mirror holding member (not shown) in a state where they are kept spacing therebetween. The second pair of mirrors 727 consist of a first mirror 727a and second mirror 727b which are parallel to each other and fixed on a mirror holding member (not shown) in a state where they are kept spacing therebetween. In the thus constituted focusing point depth displacing means 72 shown in FIG. 4, the diameter of its divergent angle is designed to gradually become larger as it becomes farther away from the fourth convex lens 725 after the second pulse laser beam 10b passes through the third convex lens 724, the first mirror 726a and the second mirror 726b of the first pair of mirrors 726, the first mirror 727a and the second mirror 727b of the second pair of mirrors 727, and the fourth convex lens 725. The divergent angle of the second pulse laser beam 10b and the beam diameter of the second pulse laser beam 10b incident on the above condenser lens 8, that is, the depth position of the focusing point Pb of the second pulse laser beam 10b that passes through the focusing point depth displacing means 72 and is converged by the above condenser lens 8 can be suitably adjusted by changing the length of the optical path by altering the installation angles of the first pair of mirrors 726 and the second pair of mirrors 727. For the adjustment of the installation angles, the mirror holding members (not shown) for holding the first pair of mirrors 726 and the second pair of mirrors 727 are turned on a point where the first mirror 726a and the first mirror 727a are point symmetrical to the second mirror 726b and the second mirror 727b, respectively.

While the present invention has been described above by way of a preferred embodiment with reference to the accompanying drawings, it should be noted that the present invention is in no way limited to the above embodiment only but can be changed or modified in other various ways without departing from the scope of the present invention. For example, in the illustrated embodiment, the convex lens 72 as the focusing point depth displacing means is arranged in the path of the second pulse laser beam 10b but the focusing point depth displacing means may be arranged in the path of the first pulse laser beam 10a. Further, the lens as the focusing point depth displacing means may be a convex lens or a set of lenses. Further, in the illustrated embodiment, the pulse laser beam is used but a continuous-wave laser beam such as a $CO_2$ laser beam may be used in the present invention.

What is claimed is:

1. A laser beam processing machine comprising:
a chuck table for holding a workpiece;
a laser beam application means for applying a laser beam capable of passing through the wafer as the workpiece is held on the chuck table; and
a processing-feed means for moving the chuck table and the laser beam application means relative to each other,
wherein the laser beam application means comprises a laser beam oscillation means, an optical transmission means for transmitting a laser beam oscillated by the laser beam oscillation means, and a transmitting/converging means having a single condenser lens for converging laser beams transmitted by the optical transmission means,
wherein the optical transmission means comprises a beam splitter for dividing a laser beam oscillated by the laser beam oscillation means into a first laser beam and a second laser beam, a focusing point position displacing means for displacing the focusing point of the first laser beam and the focusing point of the second laser beam in the processing-feed direction, and a focusing point depth displacing means for displacing the focusing point of one of the first laser beam and the second laser beam in the thickness direction of the workpiece held on the chuck table,
wherein the focusing point position displacing means has a plurality of mirrors and displaces the focusing point of the second laser beam from the focusing point of the first laser beam in the processing-feed direction by altering installation angles of the plurality of mirrors, and
wherein the transmitting/converging means causes a laser beam oscillated from the laser beam oscillation means to converge at two or more focusing points which are displaced in the processing-feed direction and in the thickness direction of the workpiece held on the chuck table through the single condenser lens.

2. The laser beam processing machine according to claim 1, wherein the focusing point depth displacing means changes the beam divergence angle of the laser beam.

3. The laser beam processing machine according to claim 1, wherein the laser beam forms a deteriorated layer in the workpiece.

* * * * *